H. TÖDT.
CENTRIFUGAL CREAM SEPARATOR.
APPLICATION FILED JULY 2, 1913.
1,087,851.
Patented Feb. 17, 1914.
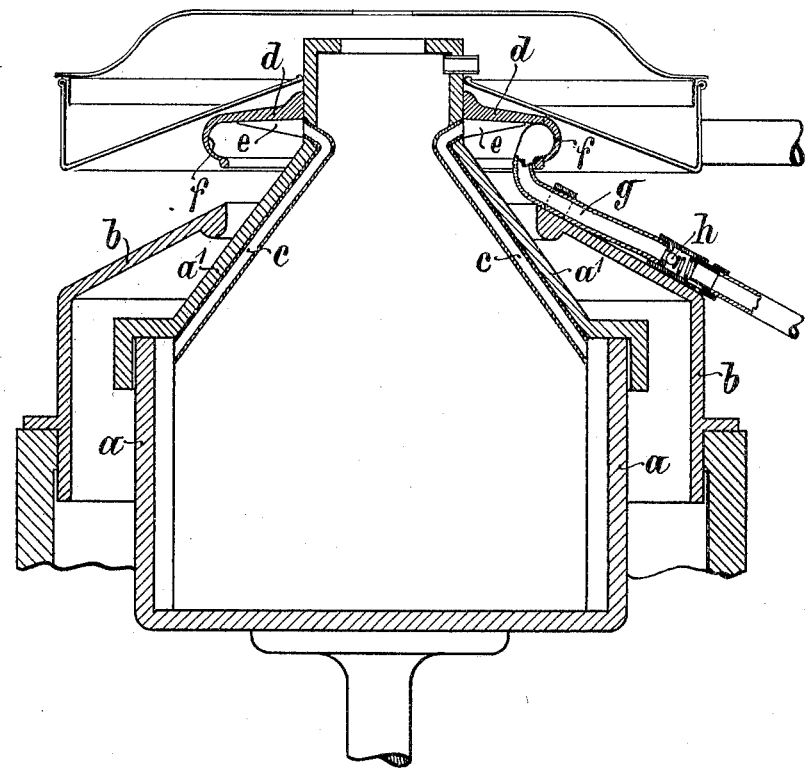
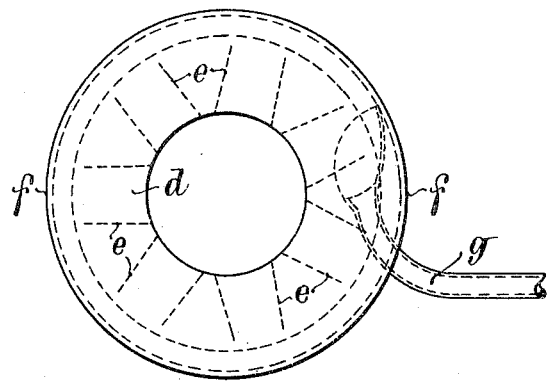

UNITED STATES PATENT OFFICE.

HEINRICH TÖDT, OF LENSAHN, GERMANY.

CENTRIFUGAL CREAM-SEPARATOR.

1,087,851.   Specification of Letters Patent.   Patented Feb. 17, 1914.

Application filed July 2, 1913. Serial No. 777,103.

*To all whom it may concern:*

Be it known that I, HEINRICH TÖDT, citizen of the German Empire, residing at Lensahn, in the Province of Schleswig-Holstein and Kingdom of Prussia, Germany, have invented certain new and useful Improvements in Centrifugal Cream-Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In vertical centrifugal cream separators the milk serum or skimmed milk is forced toward the outer wall of the separator drum by centrifugal force, while the fatty constituents are collected at the center where they form a cylinder of cream. With a continuous supply of milk to the separator, the milk serum is forced out continuously through a number of tubes mounted in the drum-neck and through the head of the drum into a collector for the skimmed milk. In consequence of the high speed of the drum the skimmed milk, as soon as it leaves the drum, is broken up into very small particles, so that the milk is completely converted into a mist or cloud. The skimmed milk, reaching the collector in this broken up condition, absorbs a very large quantity of air, thus producing a very considerable amount of froth. This froth is very inconvenient in dairies, and is especially undesirable when the skimmed milk is to be used for cheese making, as it collects numerous bacteria which are eventually found in the cheese.

The purpose of this invention is to prevent the formation of froth. This can only be attained by preventing the skimmed milk from breaking up when it leaves the drum. According to this invention a disk is fixed, for this purpose, upon the drum of a vertical cream separator, the said disk being provided with passages which form continuations of the tubes for the outflow of the skimmed milk and conduct the latter into a recess in the disk from which the milk is removd by a skimming tube hereinafter described, attached to the outer cover of the separator or to any other suitable part of the frame-work of the separator.

In the accompanying drawing is shown a centrifugal cream separator provided with the improvement.

Figure 1 is a vertical section of the separator drum, and Fig. 2 is a plan of the disk, indicating the passages and recess, mounted on the drum or on the hood of the latter.

In the drawing, *a* is the drum, *a'* its hood and *b* the outer cover. The hood *a'* receives the tubes *c* which conduct the skimmed milk from the periphery of the drum *a* along the hood *a'* and through its neck. Above the ends of these tubes *c* and below the outlet apertures for the cream, a disk *d* is fixed to the hood of the drum, which disk is provided with passages *e* and also with a circumferential recess *f*. The skimmed milk is conducted by the passages *e*, by reason of the centrifugal force, into the recess *f*, where it forms a homogeneous mass rotating with the disk. A scoop-like tube *g* reaching into the recess *f* is adapted to withdraw the skimmed milk from the latter. In this tube *g*, which is fixed to the outer cover *b* or to any other suitable part of the frame-work, is mounted a non-return valve *h*, so that when only a small quantity of milk is being supplied no air can enter the skimming tube *g*.

The improvement illustrated and described is applicable to all kinds of vertical cream separators.

Having thus described my invention, what I claim as new and desire to secure by Letters Patent is:—

1. A cream separator comprising a receptacle, a circular disk mounted on the upper end of the separator, said disk having an overhanging inwardly turned flange to form an annular channel, a plurality of radial passages on the underside of the disk, a plurality of tubes on the interior of the receptacle which communicate with the radial passages, and a stationary pipe having a flared mouth which snugly fits in the channel to receive the milk and convey same from said channel.

2. A cream separator comprising a receptacle, a circular disk mounted on the upper end of the separator, said disk having an overhanging inwardly turned flange to form an annular channel, a plurality of radial passages on the underside of the disk, a plurality of tubes on the interior of the receptacle which communicate with the radial passages, and a stationary pipe having a flared mouth which snugly fits in the channel to receive the milk, said pipe inclining downwardly to convey the milk caught in the flared mouth by gravity from said channel.

3. A cream separator comprising a receptacle, a circular disk mounted on the upper end of the separator, said disk having an overhanging inwardly turned flange to form an annular channel, a plurality of radial passages on the underside of the disk, a plurality of tubes on the interior of the receptacle which communicate with the radial passages, a stationary pipe having a flared mouth which snugly fits in the channel to receive the milk and convey same from said channel, and an automatic check valve in the pipe to prevent admission of air through said pipe to the channel.

In testimony whereof I have signed my name to this specification in the presence of two subscribing witnesses.

HEINRICH TÖDT.

Witnesses:
FR. JULIUS POTHS,
ERNEST H. L. MUMMENHOFF.